United States Patent [19]

Ueda et al.

[11] Patent Number: 4,821,187
[45] Date of Patent: Apr. 11, 1989

[54] PROCESSOR CAPABLE OF EXECUTING ONE OR MORE PROGRAMS BY A PLURALITY OF OPERATION UNITS

[75] Inventors: Hirotada Ueda, Kokubunji; Hitoshi Matsushima, Tachikawa; Yoshimune Hagiwara, Hachioji; Kenji Kaneko, Sagamihara, all of Japan

[73] Assignee: Hitachi, Ltd., Tokyo, Japan

[21] Appl. No.: 794,449

[22] Filed: Nov. 4, 1985

[30] Foreign Application Priority Data

Nov. 2, 1984 [JP] Japan ................ 59-230247

[51] Int. Cl.$^4$ ............................................... G06F 9/28
[52] U.S. Cl. ............................................... 364/200
[58] Field of Search ........................ 364/200 MS File

[56] References Cited

U.S. PATENT DOCUMENTS

| | | | |
|---|---|---|---|
| 3,631,405 | 12/1971 | Hoff et al. | 364/200 |
| 4,001,788 | 1/1977 | Patterson et al. | 364/200 |
| 4,156,279 | 5/1979 | Wilhite | 364/200 |
| 4,251,862 | 2/1981 | Murayama | 364/200 |
| 4,430,707 | 2/1984 | Kim | 364/200 |
| 4,507,728 | 3/1985 | Sakamoto et al. | 364/200 |

Primary Examiner—Gareth D. Shaw
Assistant Examiner—Debra A. Chun
Attorney, Agent, or Firm—Antonelli, Terry & Wands

[57] ABSTRACT

A processor comprises first and second operation units, a first program memory which contains first microinstructions for controlling the first operation unit and second microinstructions for controlling at least the second operation units, a second program memory which contains microinstructions for controlling the second operation unit, first control means connected to the first program memory for controlling the first operation unit and the second operation unit, and second control means connected to the second program memory for controlling the second operation unit. In a normal mode, all operation units are under control of the first control means and in a multiprogram mode, the first operation unit is under control of the first control means and the second operation unit is under control of the second control means. These two mode operations are selected in accordance with the microinstructions stored in the first or second program memories.

9 Claims, 6 Drawing Sheets

PROCESSOR CAPABLE OF EXECUTING ONE OR MORE PROGRAMS BY A PLURALITY OF OPERATION UNITS

BACKGROUND OF THE INVENTION

It has been known to connect a plurality of processors and parallelly operate them in order to increase the processing speed of a data processing apparatus. For example, the Intel "Component Data Catalog" 1981, pages 7-51 to 7-57 and 7-65 to 7-75 shows a configuration in which an input/output processor 8089 or a numeric operation processor 8087 is connected to a CPU processor 8086 or 8088 for parallel operation in order to increase the processing speed. When the input/output processor 8089 is started by the CPU, it independently processes in accordance with its own program. This type of connection requires communication between the processors for indicating the start and the end of processing. Accordingly, this configuration is suited to highly independent parallel processing, but where high speed and frequent processings are required, the execution of the program for the required communication between processors causes an increase in overhead and the processing speed is lowered.

The numeric operation processor 8087 essentially follows the CPU as opposed to the processor 8089 and merely shares a portion of instructions (floating point operation or special function operation) of a single program which the CPU serially fetches. This type of connection is superior in that it does not include an overhead due to a communication program.

However, in this configuration, instructions for the numeric operation processor 8087 are incorporated in a program for the CPU processor 8086 in addition to instructions for the CPU processor 8086, and when the CPU processor 8086 detects an instruction for the numeric operation processor 8087, it sends an instruction decode signal to the numeric operation processor 8087 to leave processing for that instruction to the numeric operation processor 8087. As a result, if the execution of the instruction for the 8087 processor is delayed for some reason, the execution of the instruction for the CPU processor 8086 is also delayed.

Accordingly, where there is a possibility that the processing in one of the processors is delayed, it is desirable that the processing in one processor and the processing in the other processor are executed by separate programs.

SUMMARY OF THE INVENTION

It is an object of the present invention to provide a processor which selectively executes a plurality of programs or one program by a plurality of operation units to execute the programs with a small overhead.

In accordance with the present invention, there are provided first and second operation units, a first program memory for storing first microinstructions for controlling the first operation unit and second microinstructions for controlling at least the second operation unit, a second program memory for storing third microinstructions for controlling the second operation unit, first control means connected to the first program memory for controlling the first and second operation units, and second control means connected to the second program memory for controlling the second operation unit. In a normal mode, both operation units are under control of the first control means so that the microinstructions stored in the first program memory control the first and second operation units and the instructions are executed by parallel operation of those operation units. In a multi-program mode, the first operation unit is under the control of the first control means while the second operation unit is isolated from the first control means and under the control of the second control means so that the microinstructions stored in the first program memory control the first operation unit and the microinstructions stored in the second program memory control the second operation unit. Accordingly, in this mode, high speed processing is attained by parallel run of the two independent programs. The switching from the normal mode to the multi-program mode is effected by a specific microinstruction stored in the first program memory. The switching from the multi-program mode to the normal mode may be effected by another microinstruction stored in the first program memory, or by a specific microinstruction stored in the second program memory.

In the processor thus configured, those instructions of two non-parallelly executed processings which can be processed synchronously to each other can be executed by the two operation units under the control of one program. Where there is a possibility that one of the processings is delayed for some reason, the two operation units independently execute the instructions under the control of the two programs.

DESCRIPTION OF THE PREFERRED EMBODIMENTS

Figure 1:
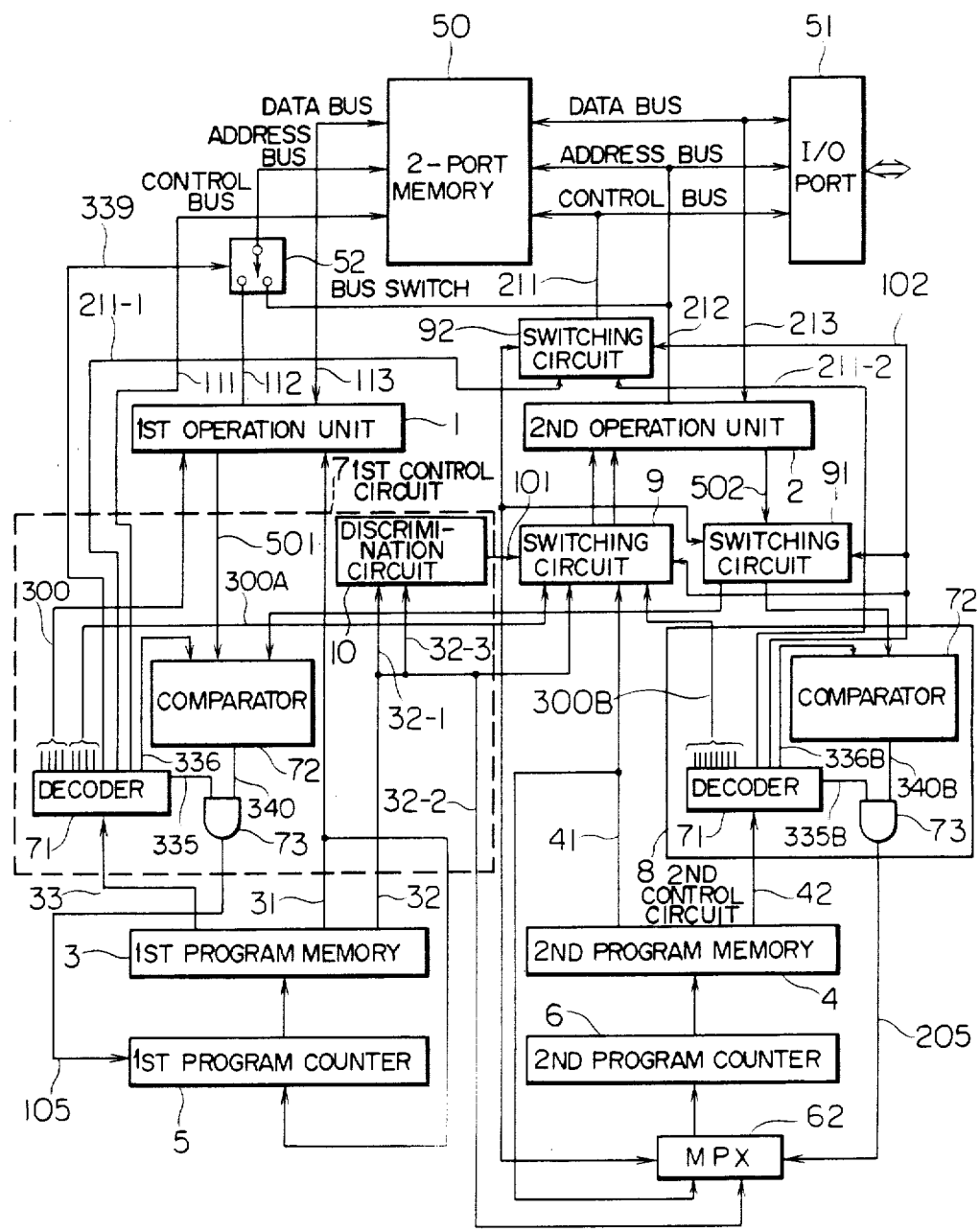
FIG. 1 is a block diagram of one embodiment of a processor of the present invention.

FIG. 1 shows one embodiment of the present invention. A first operation unit 1 and a second operation unit 2 process data and calculate addresses. A first program memory 3 stores microinstructions which control only the first operation unit 1 and microinstructions which control both the first and second operation units 1 and 2. The microinstructions are read out one at a time in accordance with a first program counter 5. A second program memory 4 stores microinstructions which control only the second operation unit 2. The microinstructions are read out one at a time in accordance with a second program counter 6. A first control circuit 7 updates or modifies the first program counter 5 in response to a control field 33 of the microprogram instruction stored in the first program memory 3. It also decodes the instruction stored in the first program memory by a decoder 71 and supplies a decode signal to the first operation unit 1, a bus switch 52, the second operation unit 2, a switching circuit 92 and a two port memory 50 to control the operation in the first operation unit 1, the switching of the bus switch 52, the operation in the second operation unit 2 and the two-port memory 50. A second control circuit 8 updates or modifies the second program counter 6 in response to a control field 42 of the microprogram instruction stored in the second program memory 4. It also decodes the instruction stored in the second program memory 4 by a decoder 71 and supplies a decode signal to the second operation unit 2, and the switching circuits 91 and 92 to control the operation in the second operation unit 2 and the switching of the switching circuits 91 and 92.

A discrimination circuit 10 in the first control circuit 7 controls the setting of the second program counter 6 and the switching of the switching circuit 9 in response to a multi-program mode shift instruction or a forced return instruction in the microprogram stored in the first program memory 3. The instructions stored in the first program memory 3 are sequentially read out by the first program counter 5. The instructions stored in the second program memory 4 are sequentially read out by the second program counter 6. A two-port memory 50 is connected to the first operation unit 1, the second operation unit 2, the first control circuit 7 and the second control circuit 8, and it can be accessed from either one of the operation units 1 and 2. Control signals are transmitted between the operation units and the control circuits through control buses 111 and 211, addresses are transferred through address buses 112 and 212, and data are transferred through data buses 113 and 213.

The switching circuit 9 selects a second operation field of the microinstruction stored in the first program memory or an operation field 41 of the microinstruction stored in the second program memory and supplies the selected operation field to the second operation unit 2. It also selects a second operation control field 32-2 of the microinstruction stored in the first program memory or a control field 42 of the microinstruction stored in the second program memory and supplies the selected control field to the second operation unit 2. Numeral 51 denotes an input/output port through which data is exchanged with an external device.

Figure 2A:
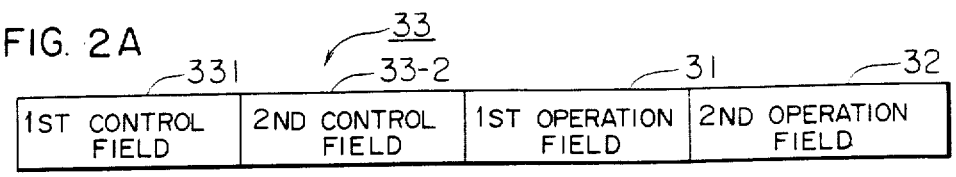
FIG. 2A shows a format of a microinstruction which is stored in a first program memory 3 and controls first and second operation units.
Figure 2B:
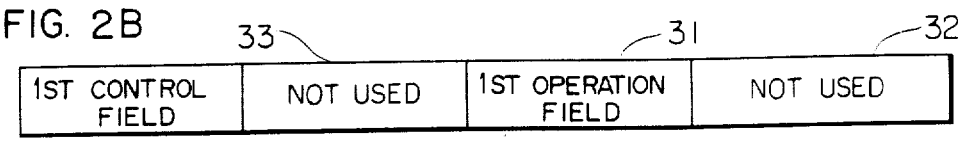
FIG. 2B shows a format of a microinstruction which is stored in the first program memory 3 and controls the first operation unit.

FIG. 2A shows a basic format of the microinstruction which is stored in the first program memory and controls the first and second operation units. FIG. 2B shows a format of the microinstruction which is stored in the first program memory and controls only the first operation unit. The present embodiment relates to a processor for executing horizontal microprograms. The first operation field 31 designates an operation of the first operation unit 1, and the second operation field 32 designates an operation of the second operation unit.

The control field 33 includes control information for an overall control including bus switching and input/output sequence control. The control field 33 is divided into the first control field 33-1 and the second control field 33-2 and contains bus control instructions. The first control field 33-1 controls the first operation unit 1 and the second control field 33-2 controls the second operation unit 2.

Figure 2C:
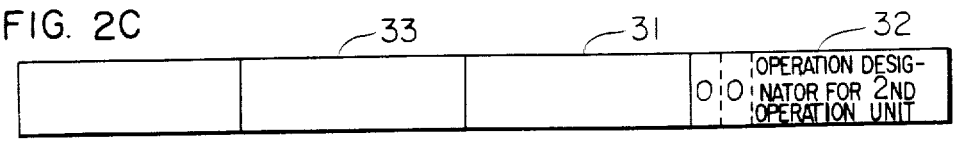
FIG. 2C shows a format of a microinstruction in a normal mode.

In a normal instruction in the normal mode, as shown in FIG. 2C, a leading bit 32-1 in the second operation field 32 and a second bit 32-3 are "0" and remaining bits 32-2 designate an operation of the second operation unit 2.

Figure 2D:
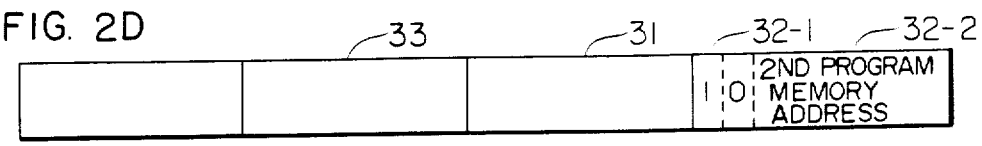
FIG. 2D shows a format of a shift instruction from the normal mode to a multi-program mode.

FIG. 2D shows a shift instruction from the normal mode to the multi-program mode. In this instruction, the leading bit 32-1 of the second operation field 32 is "1", the second bit 32-3 is "0", and the remaining bits 32-2 indicate a start address of the second program to be started.

Figure 2E:
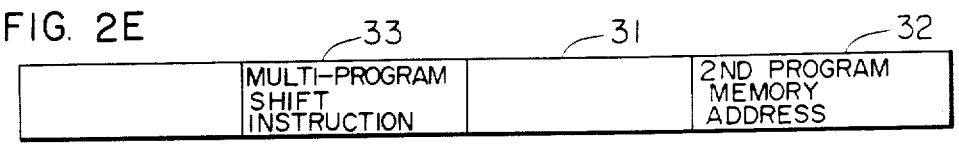
FIG. 2E shows another format of the shift instruction from the normal mode to the multi-program mode.
Figure 2F:
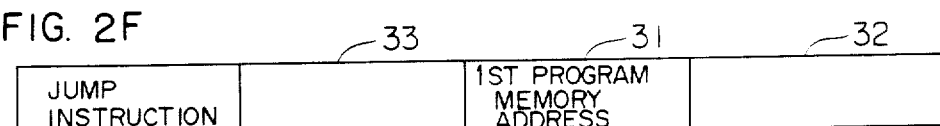
FIG. 2F shows a format of a jump instruction.
Figure 2G:
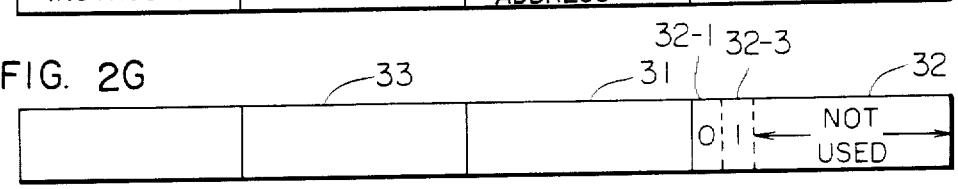
FIG. 2G shows a format of a shift instruction from the multi-program mode to the normal mode.

FIG. 2G shows a shift instruction from the multi-program mode to the normal mode. In this instruction, the leading bit 32-1 in the second operation field 32 is "0", the second bit 32-3 is "1" and the remaining bits 32 are not used.

Figure 3A:
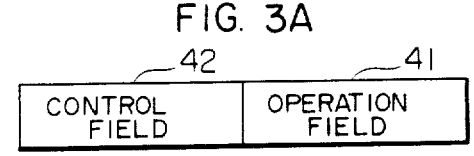
FIG. 3A shows a format of a microinstruction stored in a second program memory 4.

FIG. 3A shows a format of the microinstruction stored in the second program memory. An operation field 41 designates an operation of the second operation unit 2, and a control field 42 is similar to the control field 33 of the microinstruction stored in the first program memory.

The blocks shown in FIG. 1 are now explained in detail.

Figure 4:
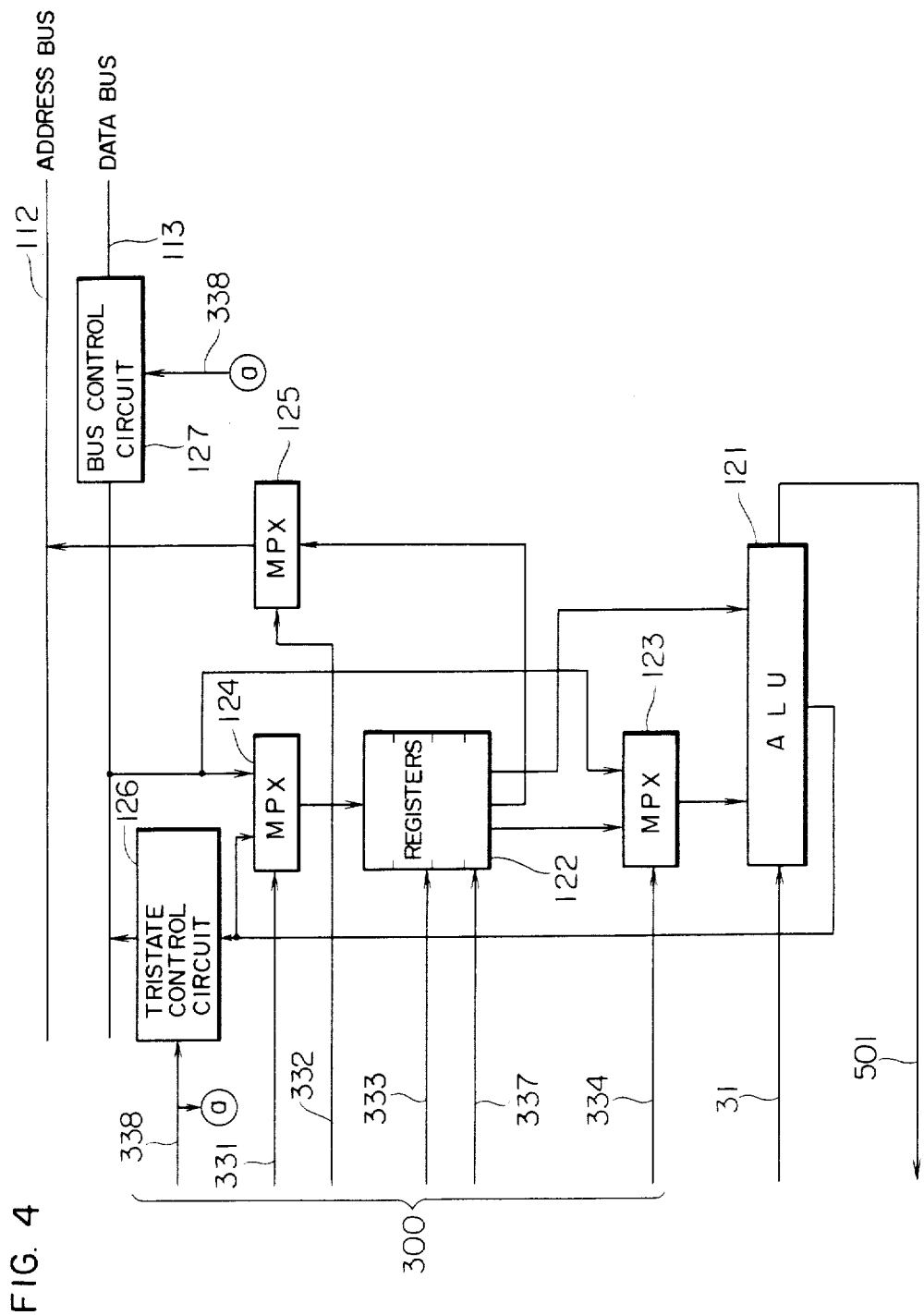
FIG. 4 is a block diagram of the first operation unit 1 of the processor of FIG. 1.

FIG. 4 shows a detail of the first operation unit 1. Numeral 121 denotes an arithmetic logic unit (ALU) which carries out addition/subtraction and shift. Data stored in registers 122 or data supplied from data bus 113 are supplied to the ALU 121. One of the inputs thereof is selected by a multiplexer (MPX) 123 by a multiplexor control signal 334. The data to be supplied to the ALU 121 is also selected by a register selection signal 333. By designation by the register selection signal 333 and a register write signal 337, output data from the ALU 121 or data from the data bus 113 is written into the selected register. The selection is made by a multiplexer (MPX) 124 which is controlled by a multiplexer control signal 331.

The output data from the ALU 121 is supplied to the data bus 113 through a tristate control circuit 126. This is controlled by a control line 338. A bus control circuit 127 is switched by the signal 338 to reverse the direction of the input/output of the data bus.

The registers 122 are connected to a multiplexer (MPX) 125, and data in one of the registers selected by a multiplexer control signal 332 is supplied to an address bus 112. The multiplexer control signals 331, 332 and 334, the register selection signal 333, the register write signal 337 and the control signal 338 are produced by the decoder 7 in the first control circuit 7.

Figure 5:
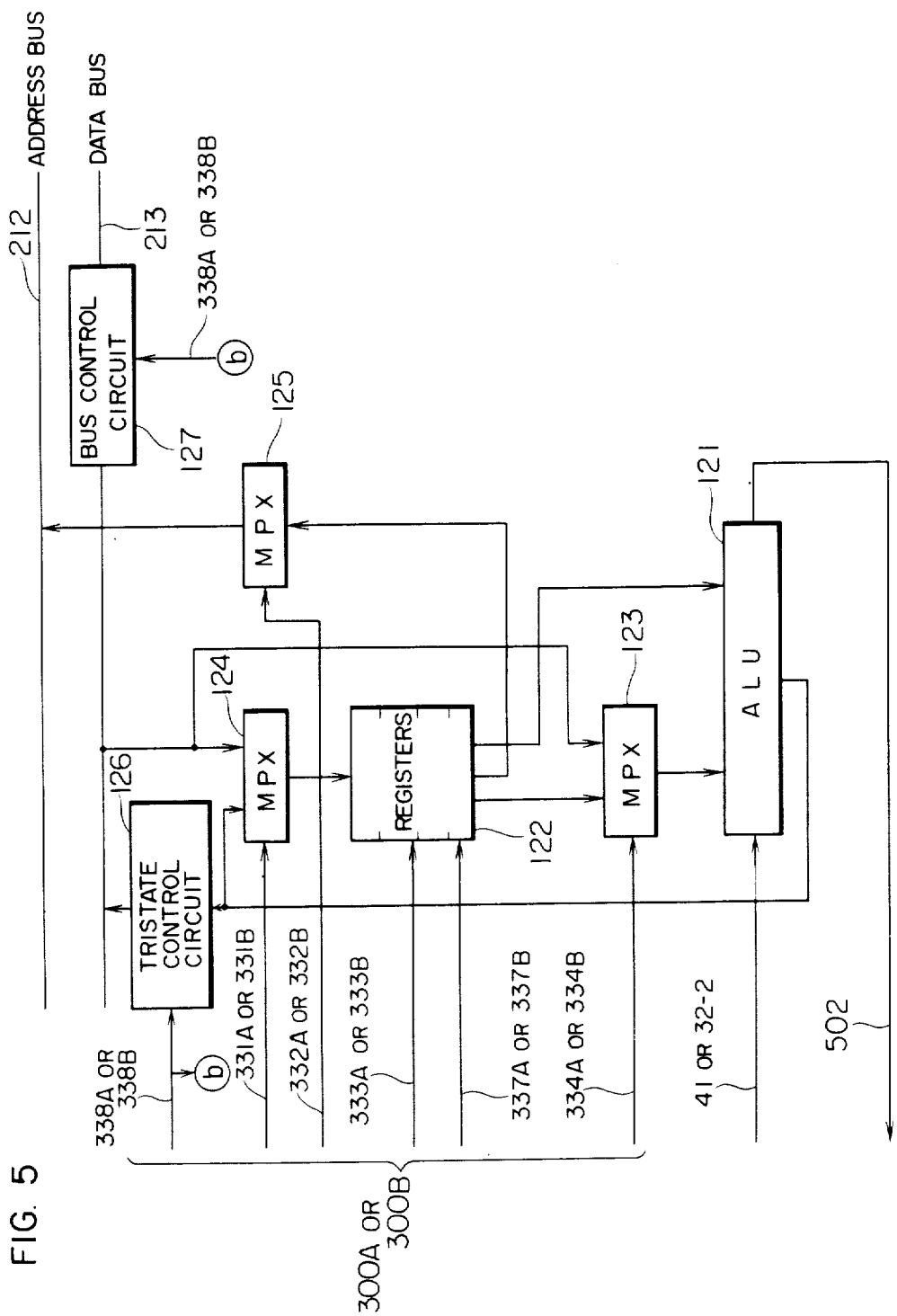
FIG. 5 is a block diagram of the second operation unit 2 of the processor of FIG. 1.

The second operation unit 2 has the same circuit configuration as the first operation unit 1 as shown in FIG. 5. Multiplexer control signals 331A, 332A, 334A, register selection signal 333A, register write signal 337A, and control signal 338A are produced by the first control circuit 7. Multiplexer control signal 331B, 332B, 334B, register selection signal 333B, register write signal 337B and control signal 338B are produced by the second control circuit 8. In FIG. 5, numerals with suffixes A or B such as 331A and 331B denote the signals corresponding to those without suffixes shown in FIG. 4.

A detail of the first control circuit 7 shown in FIG. 1 is now explained. The decoder 71 decodes the first control field 33-1 and the second control field 33-2 in the control field 33 and produces the multiplexer control signal 331, 331A, 332, 332A, 334 or 334A, the register select signal 333 or 333A, a jump signal 335 or 335A indicating a jump instruction, or a jump condition signal 336 or 336A for the jump instruction, in accordance with the decoded instruction code. It also produces the register write signal 337 or 337A and the control bus 111 or 211-1. For the jump instruction, a comparator 72 produces an equal signal 340 when a status word signal 501 from the first operation unit and a status word signal 502 from the second operation unit are equal to the jump condition signal 336. The equal signal and the jump signal 335 are outputted from an AND circuit 73 as a program counter load signal 105, which is a load signal to the first program counter 5. When this signal 105 is supplied, the first program counter 5 loads a jump-to address coded in the first operation field 31 as a new content of the program counter as shown in FIG. 2F. That is, a jump operation is carried out. When the program counter load signal 105 is not supplied, the first program counter 5 increments. Thus, in a normal course of operation, the instructions are sequentially read out and executed. The second control circuit 8 of FIG. 1 is identical to the first control circuit 7 except that the status word signal 501 is not supplied to the comparator 72. The discrimination circuit 10 monitors bits 32-1 and 32-3 and, when they are "10", that is, identify a multi-program shift instruction, it issues a control signal 101 for shifting to set the bits 32-2, that is, the start address of the microprogram stored in the second program memory into the second program counter 6 through the multiplexer (MPX) 62 and switch the switching circuits 9, 91 and 92. When the bits 32-1 and 32-3 are "01", that is, the shift instruction from the multi-program mode, to the normal mode the discrimination circuit 10 issues the control signal 101 for return to switch the switching circuits 9, 91 and 92.

The switching circuit 9 receives the control signal 101 from the discrimination circuit 10 and the control signal 102 from the second control circuit 8. When the control signal 101 is the shift signal, it will invalidate the second operation field 32 and the second operation field of 33-2 of the first program memory and validates the operation field 41 and the control field 42 of the second program memory. Until the shift signal is supplied, it operates in the opposite manner.

When the control signal 101 is the shift signal (return instruction) from the multi-program mode to the normal mode, or when the return signal is supplied from the control line 102, the switching circuit 9 validates the second operation field 32 and the second operation control field 33-2 of the first program memory and invalidates the operation field 41 and the control field 42 of the second program memory. In the normal mode, the second operation control field 32-2 decoded by the decoder 71 in the first control circuit 7 switches the bus of the second operation unit 2 through the switching circuit 9. When the control signal 101 applied to the switching circuit 101 is the shift signal to the multi-program mode, the switching circuit 91 stops the supply of the status word signal 501 to the control circuit 7, and when the control signal 101 is the return signal or when the return instruction is supplied from the control line 102, it supplies the status word signal 502 to the control circuit 7. The status word signal 502 is supplied to the comparator 72 in the first control circuit 7 and is used as one of the conditions of a conditional jump in the microinstruction in the first program memory. When the control signal 101 applied to the switching circuit 92 is the shift signal to the multi-program mode, the switching circuit 92 invalidates the control signal 211-1 and validates the control signal 211-2. When the control signal 101 is the return signal or when the return instruction is supplied from the control line 102, it validates the control signal 211-1 and invalidates the control signal 211-2. The multiplexer MPX 62 functions to select the address to be loaded to the second program counter. When the jump signal 205 is issued, the operation field 41 of the microinstruction stored in the second program memory is selected and it is loaded into the second program counter, when the control signal 101 is issued, the second operation field 32-2 is selected of the microinstruction stored in the first program memory is selected by the MPX 62 and it is loaded to the second program counter.

The operation of the present invention is now explained. In the normal mode, the second operation field 32 of the microinstruction stored in the first program memory is supplied to the second operation unit 2, the first operation field 31 is supplied to the first operation unit 1, and the microinstructions which are sequentially read from the first program memory 3 by the first program counter 5 control both the first operation unit 1 and the second operation unit 2.

When the shift instruction to the multi-program mode is issued during the execution of the microinstruction stored in the first program memory, the mode is shifted to the multi-program mode and the first operation unit 1 and the first control circuit 7 execute the microinstructions fetched from the first program memory 3 by the first program counter 5, and in parallel therewith, the second operation unit 2 and the second control circuit 8 executes the microinstructions fetched from the second program memory 4.

The return from the multi-program mode to the normal mode is now explained. There are two cases. In one case, the mode is returned to the normal mode when the execution of the microinstructions stored in the second program memory is completed. In the other case, the mode is forcibly returned to the normal mode during the execution of the microprograms by a reason such as a detection of a fault in the external circuit. The former is called a normal return and the latter is called a forced return.

Figure 3B:
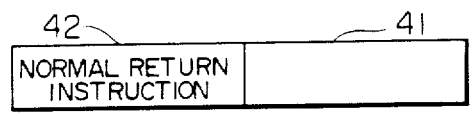
FIG. 3B shows a format of a normal return instruction from the multi-program mode to the normal mode.

For the normal return, an instruction (normal return instruction) for instructing the return to the normal mode is prepared in the instruction sets of the microprogram stored in the second program memory, and it is put at the end of the started program stored in the second program memory. For example, as shown in FIG. 3B, the normal return instruction code is put in the control field 42.

Figure 2H:
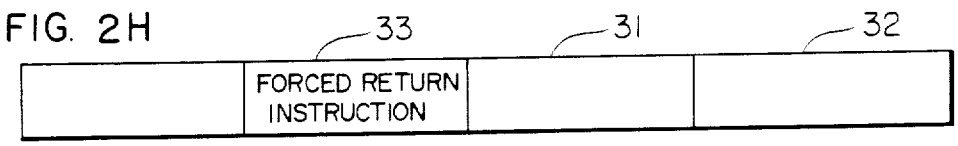
FIG. 2H shows a format of a forced return instruction from the multi-program mode to the normal mode.

For the forced return, an instruction is prepared in the program stored in the first program memory as shown in FIG. 2H.

Figure 7:
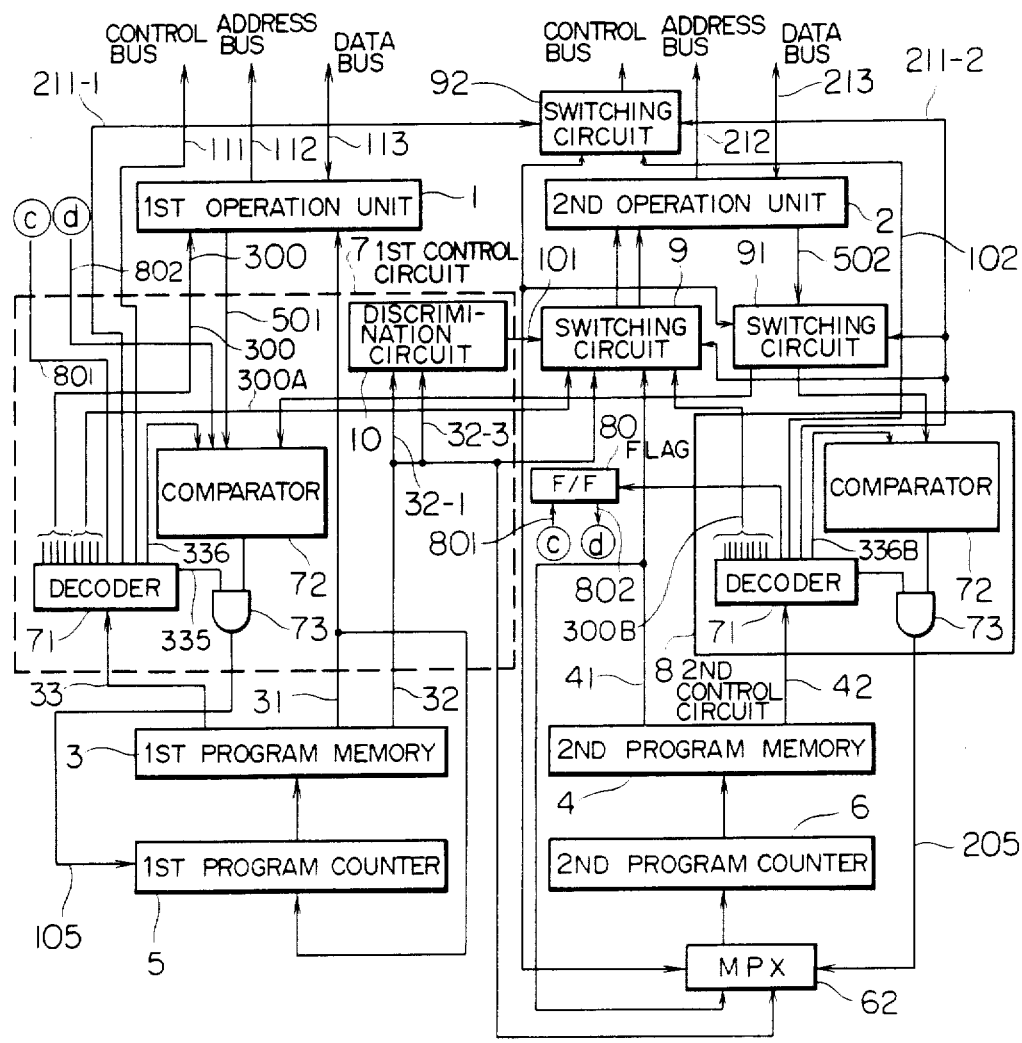
FIG. 7 is a block diagram of a further embodiment of the processor of the present invention.

There are many methods for the second program to be executed in the normal mode at the end thereof. If the first program is structured such that the second program is executed in the normal mode at an anticipated end time of the processing even if the completion of the second program is somewhat delayed, the instructions in the first program may be merely executed sequentially. In this case, the first program may be structured such that the normal return instruction is not used but the forced return instruction is executed at the anticipated processing completion time. Alternatively, the end of the second program may be indicated to the first program. For example, as shown in FIG. 7, a flag 80 is provided, and an instruction for setting the flag 80 (which is decoded by the decoder 71 in the first control circuit 7 and applied to the flag 80 as a flag set signal 801) and a jump signal conditioned by the reset status of the flag 801 which is applied to the comparator 72 in the first control circuit 7 as a flag status signal 802 to control the jump) are prepared in the instruction set stored in the first program memory. On the other hand, an instruction to reset the flag (which is decoded by the second control circuit 8 and applied to the flag 80 as a flag reset signal 803) is prepared in the instruction set stored in the second program memory. By using those instructions, the mode is shifted to the multi-program mode after the flag has been set for the microprogram stored in the first program memory, and the conditional jump instruction is executed at an appropriate interval. On the other hand, the flag reset instruction and the normal return instruction are put at the end of the microprogram stored in the second program memory. Thus, at the end of the microprogram stored in the second program memory, the flag is reset and the switching circuit 9 is switched. Then, as the microprogram stored in the first program memory detects it, it jumps to the instruction to be executed in the normal mode and the mode is returned to the normal mode. As a result the program is executed in the normal mode immediately after the execution of the program stored in the second program memory. Alternatively, the resetting of the flag may cause interruption to the program stored in the first program memory to cause the jump. Further alternatively, an interruption instruction to the microprogram stored in the first program memory may be prepared in the instruction set stored in the second program memory and it may be put at the end of the microprogram stored in the first program memory.

The selection of the normal mode and the multi-program mode is explained. In FIG. 1, the buses 112 and 113 connected to the first operation unit 1 and the buses 212 and 213 connected to the second operation unit 2 are connected to the first and second parts respectively, of the two-port memory 50. The control buses 111 and 112 are connected to the two-port memory 50 through the first control circuit 7 and the second control circuit 8, respectively. Accordingly, each operation unit can freely access the two-port memory 50. The buses 212 and 213 connected to the second operation unit 2 are also connected to the input/output port 51 so that the second operation unit 2 can exchange data with an external device. The bus switch 52 connects either one of the address buses 112 and 212 to the first port of the two-port memory 50. The switching of the bus switch 52 is controlled by the output 339 from the first control circuit 7 in accordance with a particular code in the microinstruction stored in the first program memory.

In a first example, it is assumed that data entry from an input device and data processing in the two port memory 50 are to be carried out parallelly. To this end, the processor is set to the multi-program mode, and the bus switching circuit 52 is switched to the bus 112. Under this configuration, the first operation unit 1 processes the data in the two-port memory 50 in accordance with the microprogram stored in the first program memory, and in parallel therewith, the second operation unit 2 writes the input data supplied through the input/output port 51 into the two-port memory 50 in accordance with the microprogram stored in the second program memory. Accordingly, in this mode, even if queuing is necessary for data processing, the queuing is carried out by the microprogram stored in the second memory so that the data can be correctly received. The microprogram stored in the first program memory can process the data at the maximum speed irrespective of the queuing. This mode is particularly effective where an image is read by a scanner which generates data at an externally determined timing and the data is sequentially processed.

In a second example, it is assumed that the data in the two-port memory 50 is to be processed at a high speed and an address calculation therefor is complex. Where the image is inputted while it is pre-processed and then is further processed, a data arrangement is of two or more-dimension structure and a complex address calculation is required in many cases. When a predetermined number of pixels have been inputted in the multi-program mode, the processor is set to the normal mode and the bus switch 52 is switched to the bus 212. Under this configuration, while the first operation unit 1 processes the data read from the two-port memory, the second operation unit 2 parallelly calculates the address of the data to be read next from the two-port memory.

The second example is suitable to the processing in the normal mode and not suitable to the processing in the multi-program mode, because, in the multi-program mode, the two operation units cannot synchronize the operations (data processing and address calculation) to each other. For example, where the first operation on unit 1 which is operating the data decodes the condition and jumps accordingly, the number of steps of program execution changes significantly depending on the presence or absence of the jump. It is necessary to indicate to the second operation unit 2 to advance or retard the calculation of the next address by the second operation unit 2. To this end, it is necessary to use the multi-program mode shift instruction for each address calculation or to include such an instruction in the program that the first operation unit 1 reads out and decodes the flag set by the second operation unit 7 (for example, a portion of the two-port memory 50 is normally set to "0" and it is set to "1" when the flag is set). The inclusion of such or extra instruction delays the execution of the entire program.

When compared with a case where the data processing and the address calculation are alternately carried out by the signal operation unit, the throughput is improved as much as two times by a simple estimation. In the single operation unit system, the registers are short when the data processing and the address calculation are switched and hence the processed data must be temporarily buffered to the memory. Accordingly, it is considered that the throughput is improved by more than double.

The switching circuit 9 has been shown as an independent circuit, although it may be a portion of the first control circuit 7 or other circuit. Further, third and fourth switchable operation units and program control units may be added.

Figure 6:
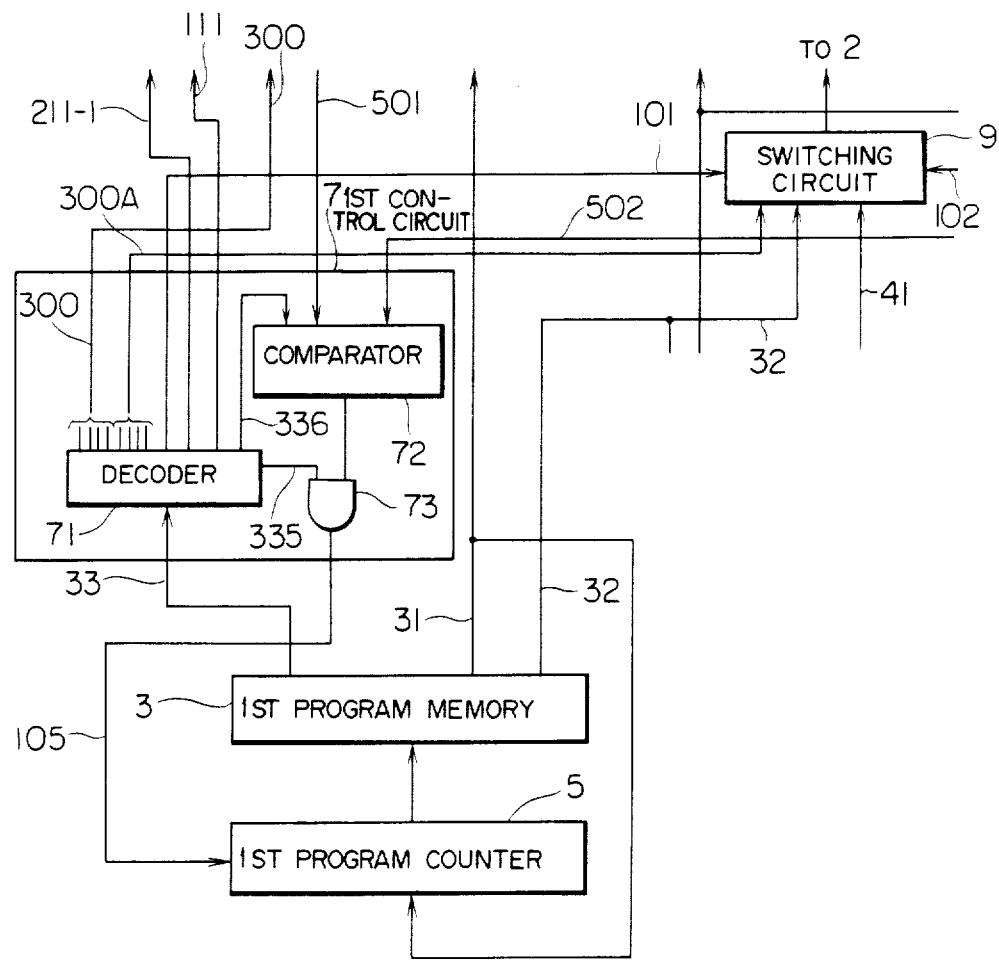
FIG. 6 is a block diagram of another embodiment of the processor of the present invention.

As a modification of the multi-program mode shift instruction, a code indicating the shift to the multi-program mode may be put in the control field 33 of the instruction stored in the first program memory, as shown in FIG. 2E. In this case, as shown in FIG. 6, the discrimination circuit 10 is omitted and the first control circuit 7 generates a control signal 101 to start the program stored in the second program memory. The control signal 101 is generated from the decoder 71 in the first control circuit.

As a modification of the normal return instruction, a specific bit in the operation field of the microinstruction stored in the second program memory may be used to instruct the normal return. In this case, a second discrimination circuit (not shown) which monitors the specific bit to generate the control signal 102 is provided.

As a modification of the forced return instruction, as shown in FIG. 2H, a code for indicating the forced return may be put in the field 33 and the first control circuit 7 may detect it to control the return operation. The field assignments of those instructions change slightly from instruction to instruction. For example, as shown in FIG. 2F, the jump instruction includes the code indicating the jump in the control field 33, and a jump-to address in the first operation field 31.

In the present embodiment, the microinstruction which has the first and second fields to control the first and second operation units is used as the microinstruction of the first program memory. By using such an instruction, the first and second operation units can be controlled in each cycle and the processing speed is increased. The present invention is also effective for vertical microinstructions having fields for controlling only one of the first and second operation units.

We claim:
1. A processor comprising:
   first and second operation means for processing data;
   first memory means for storing a first program including microinstructions which control only said first operation means and microinstructions which control both said first and said second operation means;
   second memory means for storing a second program including microinstructions which control only said second operation means;
   first control means connected to said first memory means for sequentially reading out the microinstructions in said first program, for decoding the read out microinstructions, for supplying first control signals to said first operation means to control said first operation means when the read out microinstructions are the microinstructions which control the first operation means, and for supplying second control signals to control both of said first and said second operation means when the read out microinstructions are the microinstructions which control both said first and said second operation means;
   second control means connected to said second memory means for sequentially reading the microinstructions in said second program, for decoding the microinstructions and for supplying third control signals to control only said second operation means; and
   switching means connected to said first and second control means and responsive to a shift microinstruction for selecting said second or third control signals and for thereafter supplying the selected control signals only to said second operation means.

2. A processor according to claim 1, wherein said switching means includes means for responding to a first shift microinstruction in said first program to thereafter select the third control signals, for responding to a second shift microinstruction in said first or second program to thereafter select the second control signal, for supplying the selected second or third control signals to said second operation means, and for responding to said first shift microinstruction in the first program to supply a signal to start processing under control of the second program by said second operation means.

3. A processor according to claim 1, wherein each of said microinstructions which control at least said second operation means in the first program has first and second fields for controlling the first and second operation means, and said first control means includes means for decoding the first and second fields of the microinstructioins which control said second operation means and for producing the first and second control signals, respectively.

4. A processor according to claim 2, wherein the second shift microinstruction is a microinstruction in said second program, and said second control means includes means for informing end of selection of the third control signals to said first control means in response to the second shift microinstruction.

5. A processor according to claim 4, wherein said informing means includes flag means set in response to the second shift microinstruction, and said first control means includes means for selecting a microinstruction to be fetched next from the first program in response to the output of said flag means.

6. A processor according to claim 2, wherein said switching means includes means for thereafter selecting the second control signals in response to a third shift microinstruction in the first program.

7. A processor according to claim 2, wherein said second control means includes means for sequentially reading out the microinstructions in the second program from a microinstruction having an address designated by the first shift microinstruction.

8. A processor according to claim 2, wherein
   said first and second operation means include means for producing first and second branch condition judge signals as results of the operations by said first and second operation means, respectively, said first control means includes first compare means for receiving the first and second branch condition judge signals and for determining if the first or second branch condition judge signal satisfies the branch condition designated by one of the microinstructions in the first or second program,
   said second control means includes second compare means for receiving the second branch condition judge signal and for determining of the second branch condition judge signal satisfies the branch condition designated by one of the microinstructions in the second program, and
   said third switching means includes means responsive to the first one of the microinstructions in the first program and the second one of the microinstructions in the second program for selectively supplying the second branch condition judge signal to one of the first and second comparator means, said means supplying the second branch condition judge signal to the second compare means for a period from the reading of the first one of the microinstructions to the reading of the second one of the microinstructions and for supplying the second branch condition judge signal to said first compare means for a period other than said period.

9. A processor according to claim 2 further comprising third memory means connected to said first and second operation means for parallelly performing a first data transfer between said first operation means and said third memory means and second data transfer between said second operation means and said third memory means.

* * * * *